(12) United States Patent
Icken et al.

(10) Patent No.: US 6,816,906 B1
(45) Date of Patent: *Nov. 9, 2004

(54) MECHANISM FOR BUILDING ACCESS CONTROL STRUCTURES FOR AUTHORING SYSTEMS

(75) Inventors: Donald A. Icken, Carmel, NY (US); Neal M. Keller, Somers, NY (US); Lisa M. Ungar, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,408

(22) Filed: May 8, 2000

(51) Int. Cl.$^7$ .............................................. G06F 15/16
(52) U.S. Cl. ...................... 709/229; 709/217; 709/218; 709/219; 707/9; 707/100; 707/104.1; 705/1; 345/700; 345/751
(58) Field of Search .................... 707/9, 104.1, 100, 707/1, 3, 10; 705/1; 709/200–205, 217–219, 229; 345/700, 751

(56) References Cited

U.S. PATENT DOCUMENTS

| | | | | |
|---|---|---|---|---|
| 4,811,199 A | * | 3/1989 | Kuechler et al. | 364/200 |
| 5,278,979 A | * | 1/1994 | Foster et al. | 395/600 |
| 5,781,909 A | * | 7/1998 | Logan et al. | 707/200 |
| 5,978,828 A | * | 11/1999 | Greer et al. | 709/224 |
| 6,088,702 A | * | 7/2000 | Plantz et al. | 707/9 |
| 6,278,448 B1 | * | 8/2001 | Brown et al. | 345/333 |
| 6,282,649 B1 | * | 8/2001 | Lambert et al. | 713/167 |
| 6,289,450 B1 | * | 9/2001 | Pensak et al. | 713/167 |
| 6,289,462 B1 | * | 9/2001 | McNabb et al. | 713/201 |
| 6,314,409 B2 | * | 11/2001 | Schneck | 705/54 |
| 6,356,910 B1 | * | 3/2002 | Zellweger | 707/100 |
| 6,408,336 B1 | * | 6/2002 | Schneider et al. | 709/229 |
| 6,427,063 B1 | * | 7/2002 | Cook et al. | 434/350 |
| 6,526,513 B1 | * | 2/2003 | Shrader et al. | 713/200 |

FOREIGN PATENT DOCUMENTS

WO   WO 2084521 A1 * 10/2002   ........... G06F/17/30

OTHER PUBLICATIONS

Prevelakis V, "Managing Large WWW sites", Internet Research: Electronic Networking Applications and Policy, v9, Issue 1, 1999, ISSN 1066–2243, at http://hagar.up.ac.za/catts/ole/management/prevelakis.htm.*

* cited by examiner

Primary Examiner—Hosain Alam
Assistant Examiner—Liang-che Wang
(74) Attorney, Agent, or Firm—Scully, Scott, Murphy & Presser

(57) ABSTRACT

The present invention relates to the field of distributed authoring systems, and particularly to the implementing of authoring controls within the authoring system. Moreover, the authoring system is provided with a mechanism for the creating of customizable control structures for an access control engine which is adapted to select criteria to provide system access to selective authors or users.

21 Claims, 3 Drawing Sheets

FIG. 3

| ROLE | ATTRIBUTE | LOGIC | VALUE | CHOICE COMPONENT | PERMISSION |
|------|-----------|-------|-------|------------------|------------|
|      |           |       |       |                  |            |
|      |           |       |       |                  |            |
|      |           |       |       |                  |            |
|      |           |       |       |                  |            |
|      |           |       |       |                  |            |

| CHOICE COMPONENT | ATTRIBUTE | WHICH DISPLAY COMPONENT |
|------------------|-----------|-------------------------|
|                  |           |                         |
|                  |           |                         |
|                  |           |                         |
|                  |           |                         |

— 40

MECHANISM FOR BUILDING ACCESS CONTROL STRUCTURES FOR AUTHORING SYSTEMS

BACKGROUND OF THE INVENTION

1. Field of the Invention

The present invention relates to the field of distributed authoring systems, and more particularly pertains to the implementing of authoring controls within the authoring system. Moreover, the invention is directed to providing the authoring system with a mechanism for the creating of customizable control structures for an access control engine which is adapted to select criteria to provide system access to selective authors or users.

In essence, authoring systems, which may also be known as authoring tools or authorware in technological and commercial applications, may be programs existing in rag hypertext and multimedia applications. Pursuant to more sophisticated applications, in internet, on-line or CD-ROM programs, the authoring systems may be scripting language or graphics elements, or may even represent a mixture of textual (teaching tools, printed works and the like) material, graphical representations, audio data and numerous, practically unlimited types of objects or programs. These authorizing systems are ordinarily developed and designed by authors who define the relationships of the foregoing aspects with each other, and sequencing the programs in an appropriate order for data storage.

2. Discussion of the Prior Art

In the present state of the technology and industry, authoring systems are adapted to control authoring access, generally to an authoring system utilizing various control parameters such as check-in/check-out, access control lists, profiles and predefined roles which are assigned to various authors of the system.

In various of the presently developed and known authoring systems, the access control mechanisms which facilitate access to the authoring system are specified or predefined by the system itself; whereas, other authoring systems do not provide access control systems or similar arrangements.

SUMMARY OF THE INVENTION

In order to obviate and overcome the limitations encountered in present authoring systems, a primary aspect of the present invention resides in the provision of an improved authoring systems, in which a build mechanism directs the access control engine to create, modify or delete access control structures thereby implementing authoring control. Each author's authority is controlled by the roles of which they are a member. Each role is associated with attributes, values and logic used during actual authoring to control content selection and how the selected content is displayed. Using the logic, attributes and values, authoring control can be tied more closely to the actual content, unlike other role based systems.

The build mechanism defines new roles, including associated attributes, logic and values, as well as associating attributes and logic to specific display components The roles will be used by other parts of the authoring system to control the selection and display of content. In cases where an author has the authority to modify roles they can determine what functionality other authors can have, including their own. Proper selection of logic can allow multiple authors to function simultaneously in the system at the same time.

The build mechanism directs the access control engine to modify an access control table for the purpose of defining the role's authoring ability. Each record in the access control table contains a role and its associated attributes, logic and values, as well as a list of logic controlled display components. Each record also contains the permissions the role's members will have on the content meeting the selection criteria. Each record defines a role (authoring ability) that will be used to select a subset of content and grant permission that determine how the selected content can be modified.

The build mechanism also directs the access control engine to modify the display components table for the purpose of determining what visual components will be use to display selected content. Each record in the display component table contains an attribute whose values will be checked and a visual display component whose format will be determined by those values.

In essence, the authoring system utilizes different parameters or criteria in order to provide reader or author (user) access thereto. Basically, these parameters or criteria include:

a) Userid (User identification)—which is designed to uniquely identify a user or numbers of users intending to gain permission for access to the authoring system;
b) Active flag—providing for indication that a particular user is logged into the authoring system;
c) Role—is utilized to group users by related functionality, which is implemented by attributes, logic and values, as defined hereinbelow;
d) Attribute—is a named field which is associated with content, display components, and/other system elements; and is utilized to tag or impart a set of values with a specific meaning or meanings;
e) Logic—utilizes boolean logic in order to test a given value against the value of a corresponding attribute in content, display component and/or other system element;
f) Value—defines a constant which is utilized in tabled logic, which is compared with corresponding constants which are assigned to content, display component or system element attributes;
g) Choice components—defines a list of that display component or those display components available to a role for both selection and display mechanisms, and which ties specific display logic to content attributes;
h) Which display component—list of which particular set of logic is to be used against the attribute in the display mechanism;
i) Permissions—to implement the "access authority of the system" for a specific role as set forth in c) hereinabove.

The foregoing parameters or criteria are employed in that the access control engine has the build mechanism providing customized control structures which may be created, modified or deleted for implementing a desired authoring control. Pursuant to the invention the customized control structures resolve access control or privileges in the authoring system, utilizing information from both an active user table and an access control structure table. In that instance, the roles are a membership structure utilized to group common functionality and to tie logic to attributes and values. Thus, the roles set forth in an access control table eliminate the need for author profiles in the authoring system, and by introducing logic and display components in the access control engine it is possible to obviate the need for having to execute logic subsequently, as do databases with their views. In the present authoring system, there is no distinction between authors and readers, and a person designated to multiple roles is imparted the combined functionality of all of the roles. Hereby, functionality is defined by the attributes, logic and values, and wherein every access is conveyed to the access control engine, imparting the authoring system with the ability to dynamically reflect changes in the 33 system.

This invention is an improved system for customizing a shared authoring interface by using roles, attributes and logic. It provides a flexible, dynamic authoring interface where changes by a primary author to a secondary author's privileges are immediately reflected in a modified authoring interface. This allows distributed authors, for example, students and faculty working on a project via networked personal electronic writing tablets, parents and children exchanging notes on an electronic home bulletin board, or writers collaborating via the Internet on a book to immediately and dynamically reflect authoring privileges and functionality in the same interface. This dynamically updated interface controls which author can do what to which section of a document, thus reducing the editorial resources required to control document changes and decreasing the cycle time to produce a series of documents.

This invention improves upon typical shared authoring systems by using roles, attributes and logic to dynamically customize the authoring interface seamlessly as changes are made in authoring privileges. It also provides enhanced capability to customize authoring interfaces beyond the few predefined graphical user interfaces typically provided by most authoring systems.

Most other systems have few predefined authoring privileges without the ability to create a number of customized privileges. Systems that allow the creation of customized authoring privileges don't have a dynamic interface using roles, attributes and logic to the graphical user interface seen by the authors with different privileges.

Accordingly, it is an object of the present invention to provide a access novel mechanism for building access control structures for authoring systems.

A further object of the present invention resides in the provision of a novel build mechanism for creating customizable control structures for the access control engine adapted to implement controls within an authoring system.

BRIEF DESCRIPTION OF THE DRAWINGS

Reference may now be had to the following detailed description of a preferred embodiment of a build mechanism for an access control engine for an authoring system pursuant to the invention, taken in conjunction with the accompanying drawings; in which:

FIG. 3 illustrates an access control structure table;

FIG. 4 illustrates a display component table utilized in connection with the authoring system.

DETAILED DESCRIPTION OF A PREFERRED EMBODIMENT

Figure 1:
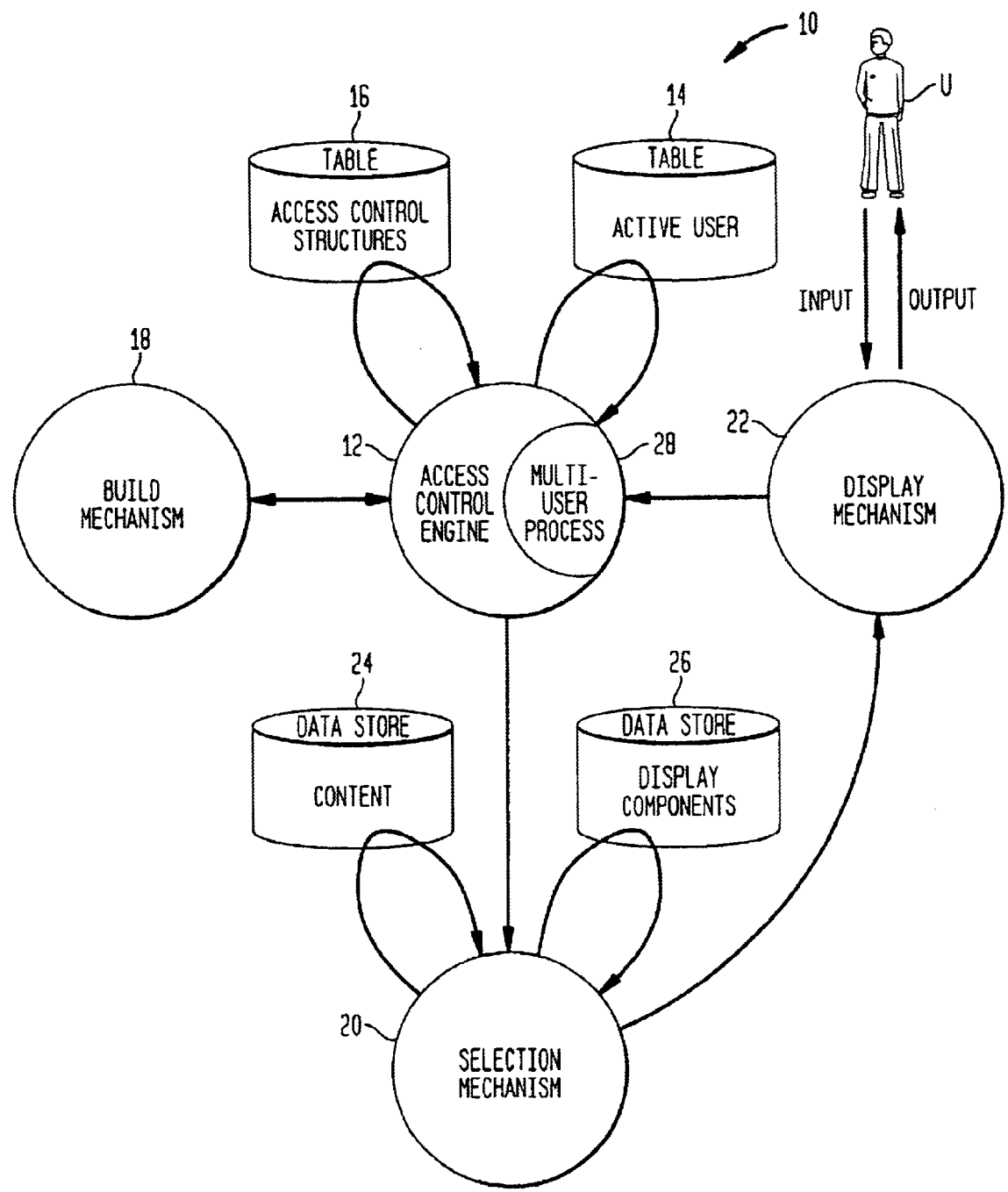
FIG. 1 illustrates in a generally diagrammatic representation, an authoring system including a build mechanism interacting with an access control engine so as to create customized control structures pursuant to the invention.
Figure 2:
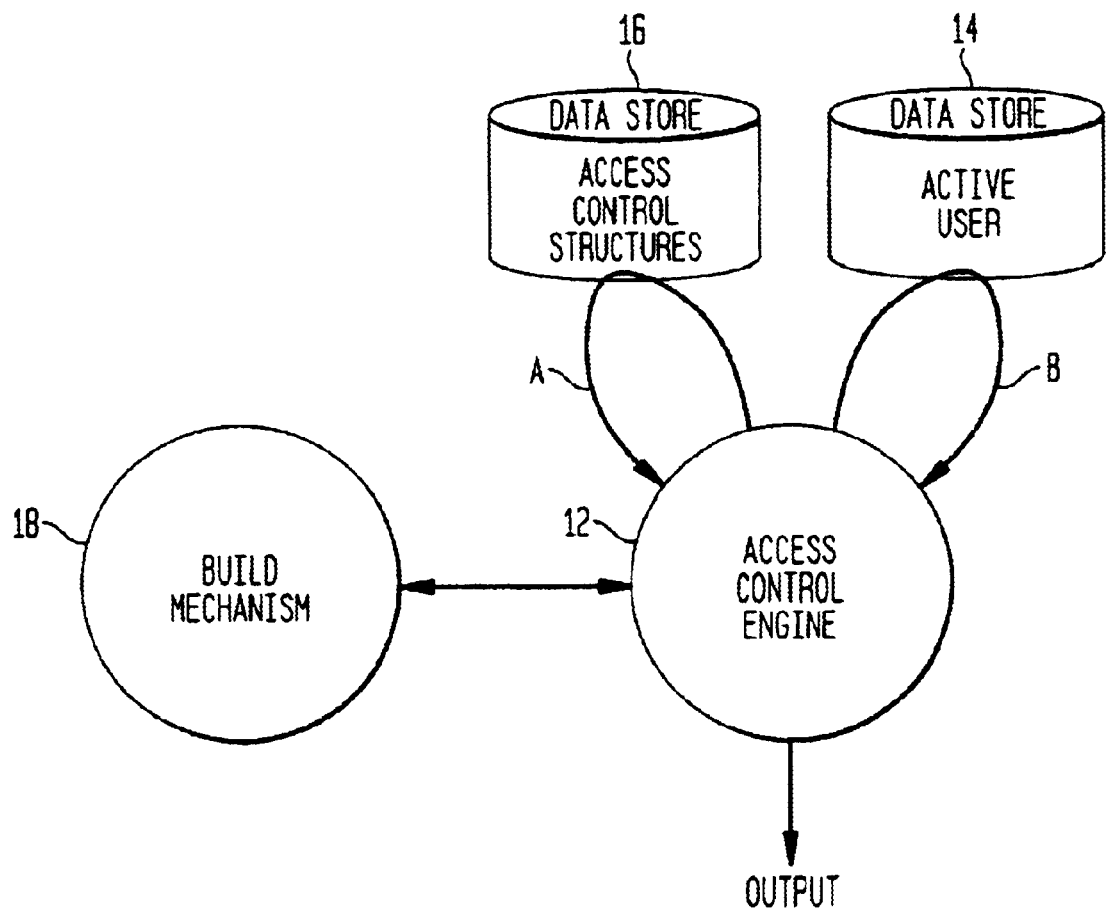
FIG. 2 illustrates the build mechanism with the access control engine, data store for access control and data store for active user pursuant to the invention.

Referring in detail to the drawings, and particularly FIG. 1, there is illustrated an authoring system 10 including an access control engine 12. The access control engine 12 resolves access control or privileges imparted to a user or plurality of users in the authoring system, utilizing information data. From both active user table 14 and an access control structure table 16, and with the data flow represented by arrows A and B in FIG. 2 of the drawings between the components 12 and 16, and respectively, components 12 and 14 of the authoring system 10.

A novel build mechanism 18 provides for customized shared authoring interfaces with appropriate variable data information and instructions to be imparted to the access control engine 12 from an external source, and conversely, and is adapted to introduce logic and display components into the access control engine, using roles attributes and (boolean) logic so as to select appropriate system components as set forth in the operating sequence step hereinbelow (steps 1 through 6).

A selection mechanism 20 derives appropriate information, for subsequent transmission to a display mechanism 22, from a data store 24 having attribute contents stored therein, and from a further data store 26 having display components stored therein for selectively relaying the foregoing data to the display mechanism 22. The latter conveys displaying information to a multi-user processing system 28 in the access control engine 12.

Thus, as shown in particular, through the Active User Table 14 in FIG. 1, a user (i.e. reader, author) U may be assigned an active status by setting an Active Flag, indicating that the user has been logged into the authoring system 10 responsive to the Userid (User identification) assigned to the user.

The foregoing user assignment as shown in the table 14 in FIG. 1 may be for any number of users $U_1$, $U_2$, - - - $U_x$, who may be assigned different roles imparting access to the authoring system 10, which may be used to group users by related functionality, as defined by attributes, logic and values. Thus, the active user table 14 which identifies the Userid, Active Flag and Role, leads to boolean logic to test a given value against a corresponding Attribute value in the content, display component and/or other authoring system constituents. The role assigned to a particular user may be predetermined by the data supplied to the access control engine 12 by the build mechanism 18, so as to impart to the user specific types of authorities, such as being capable of only reading the author material, or editing the author material at any particular site or sites.

Moreover, by way of example, a user or users or may be imparted further roles enabling him or them to access author materials at different geographic locations; for instance, a user in New York may be empowered to gain access to author material in New York, Chicago or Los Angeles. Moreover, the user may possibly be empowered to only "read" material in Chicago and Los Angeles, while being able to "edit" the author material in New York, although numerous permutations and different attributes may be assigned to any particular user or users at any specific location or locations in accordance with data supplied to the active user table 14 from the access control engine 12.

As illustrated in FIG. 3 of the drawings, the access control structure table 16 assigns to the particular user or users a role, various attributes, (boolean) logic values, choice components and permission for accessing which define the different types of access the user may have by means of the access control engine 12, wherein the table contains the foregoing information which has been imparted thereto through the access control engine 12 by data from the build mechanism 18, which was imputted from an external source or authority. In that instance, the build mechanism 18 assembles or builds the informative/data elements which are needed by the access control engine 12 to provide the required customized information and criteria to selected of the remaining operative components of the authoring system 10. The selection mechanism 20, in turn, selects the content and display components based on information which is provided thereto by the access control engine 12. In turn, the display mechanism 22 builds or formulates a display which is based on information provided thereto by the selection mechanism 20. The display components table 40 based on the data store 26 for the display components is correlated, for the respective users, which choice component, attribute and display component is to be selected for exhibit on the display mechanism or screen 22. The multi-user process 28 of the authoring system utilizes the access control engine 12 in order to determine the relationship between the multiple authors to which access is to be gained.

Reverting to a typical scenario in the application of the authoring system 10 through intermediary of the inventive build engine imputting to the access control engine 12 so as to customize selection of access control structures the following sequence of operating steps is set forth hereinbelow:

Step 1) The access control engine receives a service request;
Step 2) The access control engine sends a service request to the build mechanism shown in FIG. 1;
Step 3) The build mechanism determines if the request is for authoring access (Access Control Table, FIG. 3) or for control of display formatting (Display Component Table, FIG. 4);
Step 4) The build mechanism, based on the nature of the request received in Step 1) directs the access control engine to add, modify, or delete information in either the access control table or display component table.
Step 5) The access control engine validates the new request against the access control structure table; and
Step 6) The access control engine performs the required changes.

The foregoing, in essence, imparts a customized control ability to the authoring system 10 from the build mechanism, so as to be able to select specified operative components and sequences of operation which will dynamically reflect and respond to changes in the authoring system, thereby enhancing the versatility of the system in the customizing of the control structures.

While the invention has been particularly shown and described with respect to preferred embodiments thereof, it will be understood by those skilled in the art that the foregoing and other changes in form and details may be made therein without departing form the spirit and scope of the invention.

What is claimed is:

1. An authoring system including mechanisms for enforcing authoring controls so as to selectively impart access to one or more authors to said authoring system predicated on specific criteria, said system comprising:
   a) an access control engine wherein Boolean logic changes dynamically in response to multiple roles and existing attributes and values to enable a single pass access to the authoring system; and
   b) a build mechanism for said access control engine for providing instructions to said access control engine to modify a display components table and an access control table to provide customized access to one or more authors to the authoring system.

2. An authoring system as claimed in claim 1, wherein the building of authoring privileges dynamically reflects and responds to changes in the authoring system.

3. An authoring system as claimed in claim 1, wherein single or multiple attributes with one or more values are names associated with content, display components, roles and control structures for building said customized access.

4. An authoring system as claimed in claim 1, wherein roles interact with control structures, existing relationships with other authors and Boolean logic to generate dynamic selections of content and display components.

5. An authoring system as claimed in claim 4, wherein a single role or multiple roles are affiliated with one or more authors and attributes.

6. An authoring system as claimed in claim 1, wherein the Boolean logic changes dynamically in response to multiple roles and existing attributes and values to enable a single pass access to content and display components.

7. An authoring system as claimed in claim 1, wherein the build mechanism is operatively connected to said access control engine for providing customizable control structures used by said engine to create and modify records in the access control table.

8. A method of utilizing an authoring system including mechanisms for enforcing authoring controls so as to selectively impart access to one or more authors to said authoring system predicated on specific criteria, said method comprising the steps;
   a) providing an access control engine wherein Boolean logic changes dynamically in response to multiple roles and existing attributes and values to enable a single pass access to the authoring system; and
   b) using a build mechanism for said access control engine for providing instructions to said access control engine to modify a display components table and an access control table to provide customized access to one or more authors to the authoring system.

9. A method as claimed in claim 8, wherein the building of authoring privileges dynamically reflects and responds to changes in the authoring system.

10. A method as claimed in claim 8, where single or multiple attributes with one or more values are names associated with content, display components, roles and control stones for building customized access.

11. A method as claimed in claim 8, wherein roles interact with control structures, existing relationships with other authors and Boolean logic to generate dynamic selections of content and display component.

12. A method as claimed in claim 11, wherein a single role or multiple roles are affiliated with one or more authors and attributes.

13. A method claimed in claim 8, wherein the Boolean logic changes dynamically in response to multiple roles and existing attributes and values to enable a single pass access to content and display components.

14. A method as claimed in claim 8, wherein the build mechanism is operatively connected to said access control engine for providing customizable control structures used by said engine to create and modify records in the control table.

15. A program storage device readable by machine, tangibly embodying a program of instructions executable by machine to perform method steps for selectively imparting access to one or more authors to an authoring system predicated on specific criteria, said method steps comprising:
   a) using an access control engine wherein Boolean logic changes dynamically in response to multiple roles and existing attributes and values to enable a single pass access to the authoring system; and b) using a build mechanism for said access control engine for providing instructions to said access control engine to modify a display components table and an access control table to provide customized access to one or more authors to the authoring system.

16. A program storage device as claimed in claim 15, wherein the building of authoring privileges dynamically reflects and responds to changes in the authoring system.

17. A program storage device as claimed in claim 15, single or multiple attributes with one or more values are names associated with content, display components, roles and control structures for building the customized access.

18. A program storage device as claimed in claim 15, wherein roles interact with control structures, existing relationships with authors and Boolean logic to generate dynamic selections of content and display components.

19. A program storage device as claimed in claim 18, wherein a single role or multiple roles are affiliated with one or more authors and attributes.

20. A program storage device as claimed in claim 15, wherein the Boolean logic changes dynamically in response to multiple roles and existing attributes and values to enable a single pass access to content and display components.

21. A program storage device as claimed in claim 15, wherein the build mechanism is operatively connected to said access control engine for providing customizable control structures used by said engine to create and modify records in the access control table.

* * * * *

UNITED STATES PATENT AND TRADEMARK OFFICE
CERTIFICATE OF CORRECTION

PATENT NO.     : 6,816,906 B1
DATED          : November 9, 2004
INVENTOR(S)    : Donald A. Icken et al.

It is certified that error appears in the above-identified patent and that said Letters Patent is hereby corrected as shown below:

Column 1,
Line 19, "existing in rag" should read -- existing in --

Column 3,
Lines 16-17, ";" should read -- ; and --

Column 6,
Line 28, "steps;" should read -- step: --
Line 44, "stones" should read -- structures --
Line 52, "method claimed" should read -- method as claimed --
Line 59, "in the control" should read -- in the access control --

Column 7,
Lines 11-12, "single" should read -- wherein single --

Column 8,
Line 1, "with authors" should read -- with other authors --

Signed and Sealed this

Twenty-fourth Day of May, 2005

JON W. DUDAS
*Director of the United States Patent and Trademark Office*